(12) United States Patent
Taylor

(10) Patent No.: US 6,311,749 B1
(45) Date of Patent: Nov. 6, 2001

(54) MULTIPLE PIECE WHEEL RIM FOR LARGE VEHICLES

(75) Inventor: Fredrick B. Taylor, Rome, GA (US)

(73) Assignee: F.B.T. Enterprises, Inc., Rome, GA (US)

(*) Notice: Subject to any disclaimer, the term of this patent is extended or adjusted under 35 U.S.C. 154(b) by 0 days.

(21) Appl. No.: 09/506,824

(22) Filed: Feb. 18, 2000

(51) Int. Cl.[7] .................................................. B60B 25/04
(52) U.S. Cl. .............................................................. 152/410
(58) Field of Search ................................. 152/409, 410, 152/DIG. 10

(56) References Cited

U.S. PATENT DOCUMENTS

| | | |
|---|---|---|
| 800,835 | 10/1905 | Seiberling . |
| 833,520 | 10/1906 | Griffiths . |
| 1,493,040 | 5/1924 | Klaus . |
| 2,478,580 * | 8/1949 | Hollerith ........................ 152/410 |
| 2,817,383 | 12/1957 | Lafaye ............................ 152/409 |
| 2,835,303 | 5/1958 | Woodward ..................... 152/410 |
| 2,894,556 * | 7/1959 | Darrow .......................... 152/410 |
| 2,895,526 * | 7/1959 | Mueller .......................... 152/410 |
| 3,043,358 | 7/1962 | Scott .............................. 152/410 |
| 3,143,377 | 8/1964 | Bulgrin et al. ................... 301/63 |
| 3,354,927 | 11/1967 | Pile ................................. 152/410 |
| 4,397,345 * | 8/1983 | Ramaratnam et al. .......... 152/410 |
| 4,438,797 | 3/1984 | Suckow .......................... 152/410 |
| 4,554,961 | 11/1985 | Osawa et al. ................... 152/410 |
| 4,706,723 * | 11/1987 | Loeber et al. ................... 152/410 |
| 4,911,216 * | 3/1990 | Yamoto et al. .................. 152/410 |
| 5,259,430 | 11/1993 | Smith et al. .................... 152/410 |
| 5,335,706 | 8/1994 | Foster ............................. 152/410 |
| 5,947,175 * | 9/1999 | Watanabe et al. ............... 152/409 |

OTHER PUBLICATIONS

OTR Wheel Engineering Appendix B 3 & 5 Piece Rim/Wheel Identification and Information Handout with Basic Inspection Guidelines, Mar. 24, 1998.
Earthmover —Rim anmd Wheel Inspection Guide, OTR Wheel Engineering, Book Num. 20, Mar. 24,1998.
OTR Wheel Engineering Earthmover and Construction Products Catalog, No. 101.

* cited by examiner

Primary Examiner—Russell D. Stormer
(74) Attorney, Agent, or Firm—Thomas, Kayden, Horstemeyer & Risley

(57) ABSTRACT

Wheel rim assembly (10) is formed in three parts, the cylindrical rim base (20), inner side flange (22) and reinforcing rim (34) all as one part, and the combination bead seat (50), annular outer side flange (52) and reinforcing rim (60) as a second part, and lock ring (76) as the third part. The flanges (22, 52) are unitarily connected to their respective rim base (20) and bead seat (50), both having reinforcing rims (34, 60), respectively, which are located in axial alignment with the cylindrical surfaces of the rim base and bead seat, respectively, lending additional strength to the flanges (22, 52). The sloped lock ring engagement surface (64) of the reinforcing rim 52 opposes a similarly sloped bearing surface (76) of the lock ring (72). The structures are fabricated by a forging process which, though expensive, significantly increases the strength of the structure.

6 Claims, 1 Drawing Sheet

MULTIPLE PIECE WHEEL RIM FOR LARGE VEHICLES

FIELD OF THE INVENTION

This invention relates to wheel rims for large industrial vehicles, such as very large earth movers and dump trucks. More particularly, the invention relates to a "three piece" wheel rim which includes a forged rim base having an integrally connected side flange, and a forged combination bead seat and side flange.

BACKGROUND OF THE INVENTION

Tires for conventional sized automobiles are mounted on wheel rims that are of essentially one piece construction. The beads at the inner perimeter of the rubber tire are flexible and stretchable to the extent that they can be slightly deformed so as to pass over the side flanges of the wheel rim and become seated on the rim between the side flanges.

When the size of the rubber tire is increased, the strength of the beads is also increased, usually with the placement of more or stronger cords that extend annularly within the beads of the tire. Because of this increased strength capacity, it is much more difficult to stretch and/or deform the beads of large and stronger tires in order to place the beads on a unitary rim structure.

To permit ease of mounting and demounting tires on wheel rim structures, a five piece rim structure was developed which could be assembled as the tire is being mounted on the rim structure. Typically, the five piece rim structure includes a cylindrical rim base which can be formed of an annular center section and opposed annular back section and gutter section, all welded together into a unitary cylindrical structure. A separately formed annular inner side flange is mounted on the rim base and held in place on the back section of the rim base by a protruding flange of the rim base. A substantially cylindrical bead seat is telescopically mounted on the gutter section of the rim base, and an annular outer side flange mounts on the bead seat and is held in place by a protrusion of the bead seat. The bead seat, in turn, is held in place by a lock ring that engages in a lock ring groove of the rim base. Typically, the rim base is placed on a support surface, such as the floor of a building, with its axis of rotation oriented vertically, and the inner side flange is telescopically mounted about the rim base and held in place adjacent the floor by the additional thickness of the back section of the rim base. Next, the annular beads of the rubber tire are telescopically moved about the rim base, to place the rubber tire on the rim structure. Lastly, the outer side flange is telescopically fitted about the bead seat, and the bead seat telescopically fitted about the gutter section of the rim base, and the lock ring snapped in place behind the bead seat. With the tire assembled in this manner, the tire is inflated and ready for mounting to a vehicle.

One of the major problems with the above noted five piece wheel rim is that during use of the rim and its tire on a large vehicle, there are many instances where the vehicle rapidly accelerates or decelerates and the tire, having traction with the ground, resists spinning with respect to the ground while the wheel rim is responding to the drive train of the vehicle in an attempt to force the tire to rotate. This results in relative movement of the rubber tire with respect to the steel wheel rim. More particularly, the frictional engagement between the inner side flange and the rubber tire is sufficient to cause the inner side flange to move in unison with the tire while the rim base moves either faster or slower than the tire. This causes relative movement between the inner side flange and the rim base, and the result is fretting or deterioration of the material of the facing surfaces of the inner side flange and the rim base. Over time, the fretting becomes so serious as to cause failure of the inner side flange and/or the rim base. The deterioration can cause air leakage between the parts, partial or complete separation of the parts, and injury to the equipment and to the personnel operating or adjacent the equipment.

The typical five piece wheel rim structures which are used for very large vehicles, such as earth movers and large dump trucks weighing 100 tons or more, have a cold tire pressure of over 100 lbs. psi. This tire pressure could easily rise to 140 lbs. psi as the air, tires and wheels heat during use of the vehicle. This tends to build up an enormous potential energy within the tires this size, and there is a hazard that the side flanges of the five piece rim structures could release under the force of the compressed air in the tire, creating extreme risk to people and equipment adjacent the wheel. The release of the side flange could be caused by cracks in the flange or by fretting of the flange which occurs at the facing surfaces of the side flange and the rim base.

Also, the prior art five piece rim structures require replacement because of the hazard of a failure of the side flanges, and possibly other components, of the rim structure. One of the causes of frequent replacement of the components of the typical five piece rim structure is that the components were rolled without forging and butt-welded by an electric weld system, and cold formed in a closed die. U.S. Pat. No. 5,335,706 to Foster discloses the process of producing a forged annular flange for a five piece wheel assembly for supporting the side wall of a tire. While the forging of the annular flange is likely to increase the strength and resistance of fretting of the facing surface of the flange, the strength of the overall structure is not similarly increased. For example, the holding flanges of the bead seat and of the back section of the rim base are not increased in strength.

Fretting of the parts of the wheel rim is not exclusively experienced between only the inner side flange and the rim base. Typically, fretting to a lesser extent is also experienced between the outer side flange and the bead seat, mainly due to the same circumstances, where the outer side flange tends to rotate with the tire and the bead seat tends to rotate with the rim base. However, because of the three piece construction of the outer side flange, bead seat and gutter section, and the relative movement possible between the rim base and the bead seat, the effect of the relative movement is less pronounced at this site of the wheel rim.

As the size of the vehicles and wheels increases due to the demand for more efficient and larger scale work projects, the problem of wheel fretting becomes more pronounced.

Three piece wheel rims which reduce the number of pieces of the wheel rim are available for intermediate sized tires. The typical three piece wheel rim includes a combination rim base and inner side flange, and a combination bead seat and outer side flange and a lock ring which holds the bead seat and outer side flange on the rim base. Typically, the prior art three piece wheel rims are formed products, in that they are made from rectilinear preformed mill sections which are acquired from steel vendors. The rectilinear pre-formed sections are cut to the proper length, and then the sections are formed by rolling and forming machines into cylindrical shapes. This is known as "hooping up the sections." The adjacent ends of the hooped up sections are butt-welded together to form continuous cylindrical rims, and the excess of the butt-weld is removed by a scarfing machine.

The hooped up welded sections are fed to machines which alternately expand and compress the sections to their dimensional requirements. The sections are then put into a vertically oriented machining center and machined to final specifications.

Once the separate cylindrical sections are formed, the sections are mated and tack welded together. This completes the rim base and inner side flange as one piece and the bead seat and outer side flange as another piece. After the tack welding has been completed, the assembled sections are put into a welding machine that forms circumferential welds at the abutting edges of the sections. After the rims are made, the rim welds are tested and cleaned with a grinder and painted. The three pieces, including the lock ring, are assembled and the completed rim is ready for shipment to the customer.

While the three piece wheel rim has been successfully used for tires of average sized industrial vehicles, the rims are not strong enough for reliable and durable use by the very large vehicles that are currently being used and being developed for future use. The prior described forming process does not provide the desired strength at the intersection of the side flanges with the cylindrical rim base or with the cylindrical bead seat, causing a likelihood of failure at the positions of maximum stress at the intersections of the side flanges and their cylindrical components.

SUMMARY OF THE INVENTION

Briefly described, the present invention comprises an improved three piece wheel rim structure for very large industrial vehicles, such as earth movers and dump trucks that are used in rugged environments, where rapid transportation of extremely heavy loads is desired.

The three piece wheel rim structure is a forged product, including a combination wheel rim base and inner side flange, and a combination bead seat and outer side flange. The lock ring which is not a forged product engages behind the bead seat with the rim base to hold the side flanges in position for engagement with the beads and side walls of the tire mounted on the rim.

The intersections of the outer side flange with the bead seat and the inner side flange with the rim base are formed with reinforcing rims of enlarged thickness and of a shape which provides increased strength at these intersections, thereby tending to resist the extreme stress normally experienced by the side flanges from the tire mounted thereon. Typically, the most extreme forces applied by the tire to the rim structure are at the intersection of the side flanges with the rim base and/or the bead seat, where the forces applied by the tire tend to bend the side flanges outwardly away from the rest of the rim structure. By increasing the thickness and adjusting the shape of the intersection between the side flanges and their cylindrical components, and by forging these products, a much stronger structure is formed. By forging the components instead of just forming them, improved grain structure can be achieved and a choice of metals can be obtained, thereby improving their strength.

Accordingly, it is an object of this invention to provide an improved strength multiple piece wheel rim for very large industrial vehicles for mounting rubber tires on the vehicle and for carrying extreme loads under extreme circumstances.

Another object of this invention is to provide an improved three piece wheel rim for large industrial vehicles which is durable under the typical extreme physical circumstances experienced by such vehicles and which avoids fretting between the parts thereof.

Other objects, features and advantages of this invention will become apparent upon reading the following specification, when taken in conjunction with the accompanying drawings.

DETAILED DESCRIPTION

Figure 1:
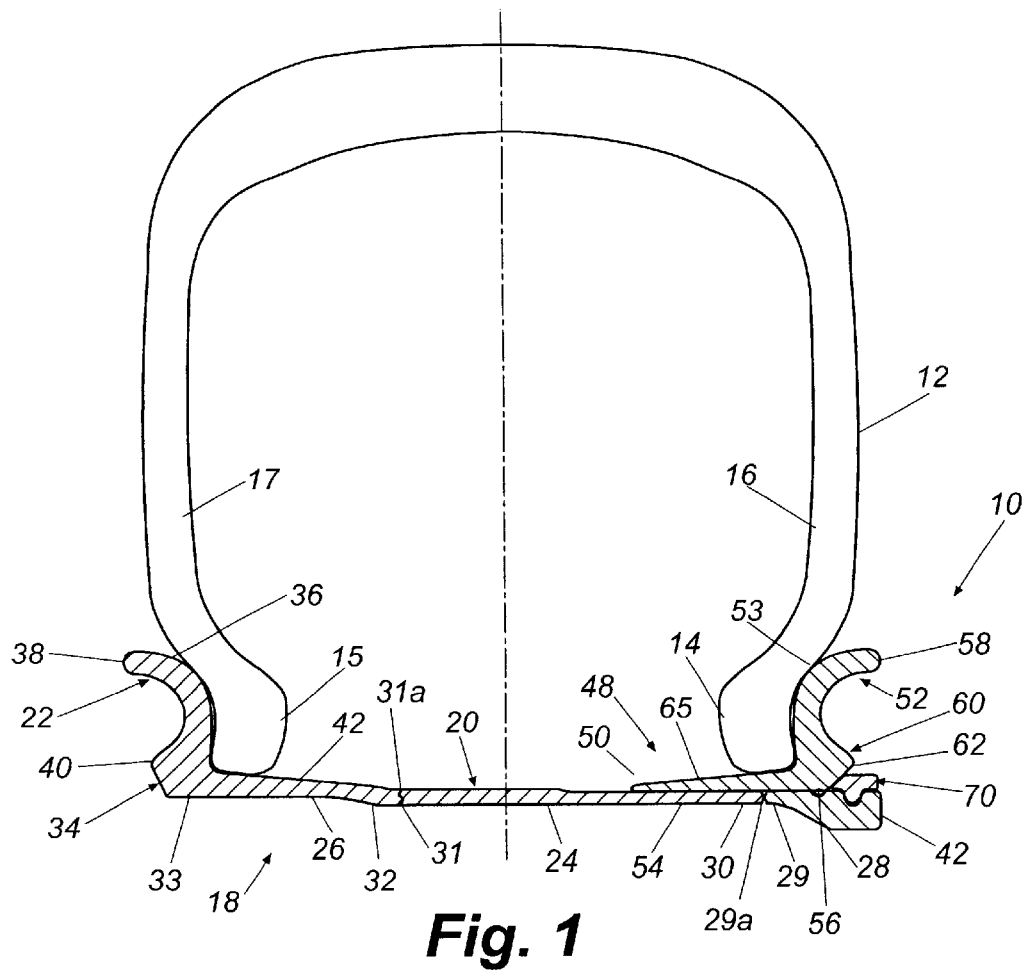
FIG. 1 is a cross-sectional view of a three piece wheel rim assembly, showing how the conventional tire would be mounted to the wheel rim assembly.
Figure 2:
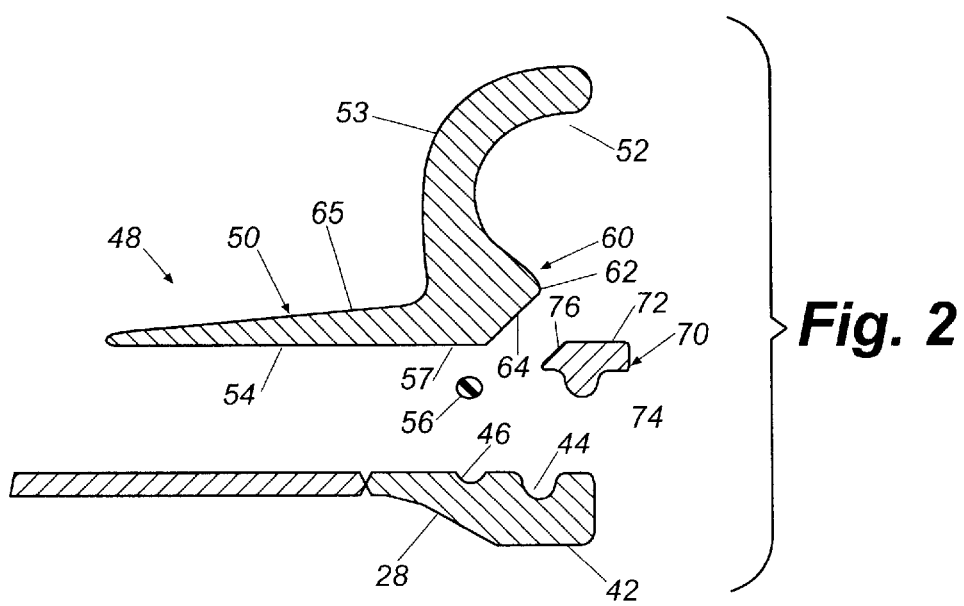
FIG. 2 is an expanded cross-sectional view of the wheel rim assembly of FIG. 1.

Referring now in more detail to the drawings, in which like numerals indicate like parts throughout the several views, FIG. 1 illustrates a wheel rim assembly 10 and a conventional tire 12 mounted on the assembly. Tire 12 includes a pair of annular beads 14 and 15 and side walls 16 and 17 which extend radially and bowed outwardly from the beads.

Wheel rim assembly 10 includes a first unitary piece 18 that comprises a cylindrical rim base 20 and an annular inner side flange 22. Rim base 20 is composed of three sections, cylindrical center section 24, cylindrical back section 26, and cylindrical gutter section 28. The inner edge 29 of the gutter section is welded at 29a to the outer edge 30 of the center section, while the inner edge 31 of the center section is welded at 31a to the outer edge 32 of the back section 26. This forms a unitary structure.

Annular inner side flange 22 is joined to rim base 20 at reinforcing rim 34, and side flange 22 defines a convex annular side seat 36 that extends first radially from the inner edge portion 33 of the rim base 20 and curving axially away from the rim base 20 and terminating in a laterally facing distal rim 38. The convex side seat 36 is thus formed so as to support tire bead 15 and the adjacent portion of the side wall 16 from axially displacement of the wheel rim assembly 10.

The reinforcing rim 34 positioned in the proximity of the junction of the annular inner side flange 22 with the cylindrical rim base 20 forms an additional thickness to the overall structure of the rim base and side flange at a position where bending stresses are most likely to occur due to the axial force typically applied by the bead 15 of the tire. The ridge 40 of the reinforcing rim 34 is in axial alignment with the outwardly facing circumferential surface 42 of the back section 26 of the rim base 20, locating the maximum thickness, and therefore maximum strength, of the reinforcing rim at the location most likely to bear the maximum axial forces from the tire 12.

Cylindrical gutter section 28 is enlarged at its outer edge portion so as to form strengthening band 42 at the outer edge of the rim base 20 and defines annular lock ring groove 44 and annular O-ring groove 46.

The second unitary structure 48 of the wheel rim assembly 10 includes bead seat 50 and annular outer side flange 52. The bead seat is substantially cylindrical and its radially inwardly facing surface 54 faces the radially outwardly facing surface of the cylindrical rim base 20, being of slightly larger diameter than the rim base 20, so as to telescopically mount about the rim base. An O-ring 56 is positioned between the bead seat 50 and cylindrical gutter section 28, in the O-ring groove 46 to hermetically seal the opposing surfaces together. The facing surface 57 of the bead seat forms an O-ring bearing surface for engaging the O-ring seal.

Annular outer side flange 52 is integrally and rigidly mounted to the bead seat 50 and extends first radially from the bead seat and curves axially of the bead seat away from the cylindrical rim base 20 and terminates in a distal rim facing laterally away from the rim base 20, to form the annular convex side seat 53 which faces the bead 14 and the adjacent portions of the side wall 16 of the tire, to resist axial displacement of the bead and side wall.

Reinforcing rim 60 is formed at the junction of the bead seat 50 and side flange 52, and comprises an increased thickness between the bead seat and side flange. The annular ridge 62 of the reinforcing rim 60 is located in axial alignment with the outer circumferential surface 65 of the bead seat 50, providing the greatest thickness and strength of the reinforcing rim in the position where the greatest stress is likely to be experienced from the axial force applied by the tire 12 against the side flange 52. It will be noted that the annular side flanges 22 and 52 are mirror images of each other.

Reinforcing rim 60 also includes a lock ring engagement surface 64 that is sloped at an acute angle upwardly from the cylindrical surface 54 of the bead seat.

The third structure 70 is a lock ring 72. The lock ring has an annular key 74 of semi-cylindrical cross-sectional shape that fits into lock ring groove 44 of the rim base 20. Lock ring bearing surface 76 is sloped at an angle that corresponds to the slope of lock ring engagement surface 64 of reinforcing rim 60, so that these opposed bearing surfaces 64 and 76 will normally be arranged in flat abutment with each other when lock ring 72 is properly seated in the lock ring groove 44.

The first and second unitary pieces 18 and 48 are fabricated by a forging process so as to assure increased strength and the desired shapes of these components when being used in the extreme stress situations of heavy load carrying vehicles, such as earth movers and large dump trucks. The cylindrical center section 24, cylindrical back section 26 with its side flange and reinforcing rim, cylindrical gutter section 28, and the combination bead seat and annular outer side flange 48 are made from billets of a specific composition of high strength low alloy steel material. The metal is heated until it is red hot and the metal becomes plasticized, between 1500° and 2000° F. The hot billets are pierced through the middle to remove a specific amount of material, depending on the end product. This donut shaped hot billet then is put through a series of open die forging mills to expand its diameter and form it into a uniform dimension. The open die forging mills are fitted with shaping dies to begin shaping the hot material into a contour of final parts. Once formed, the products would be reheated and put through more rolling and shaping dies to further shape the contours of the parts. At the end of this hot process, the parts should be in near final shape.

After shaping, the parts would be put into a liquid quench to cool and stabilize the granular properties of the metals. From quenching, the parts are allowed to cool to normal ambient temperature.

The forged parts then are machined on a vertical mill to remove excess material and to machine in the critical dimensions for making an earth moving rim suitable for mounting the off-road tires utilized today and planned for use in the future.

The finished machine parts of the rim base 20, including the cylindrical center section 24, the cylindrical gutter section 28 and the cylindrical back section 26 and its side flange 22 and reinforcing rim 34 are then placed together and welded at their adjacent edge portions. After welding the completed cylindrical rim base 20 is primer coated and finish painted.

Combining the annular inner side flange 22 with the cylindrical back section 26 eliminates any relative movement between these parts, and therefore eliminates the associated fretting of these parts, resulting in a longer lasting, stronger and more leak proof structure. The increased thickness of the reinforcing rim 34 provides additional strength required to resist the axial forces applied to the rim structure by the tires of the large vehicles. Likewise, the combination of the bead seat 50 and annular outer side flange 52 eliminates separate components and therefore eliminates the fretting that is associated with relative movements of the parts with respect to one another. In addition, the enlarged thickness of the reinforcing rim 60 assures proper strength of the bead seat and annular outer side flange combination that would be available to oppose the axial forces applied by the tire 12.

The increased strength of the wheel rim assembly 10 is due to its modified design and by the forging of the product. The forging adds grain structure strength as well as the ability to utilize the desired metals in the mixture of metals forming the parts.

Although a preferred embodiment of the invention has been disclosed in detail herein, it will be obvious to those skilled in the art that variations and modifications of the disclosed embodiment can be made without departing from the spirit and scope of the invention as set forth in the following claims.

What is claimed is:

1. A multiple piece wheel rim for large wheels of industrial vehicles for mounting rubber tires on a vehicle comprising:
   a first unitary piece comprising:
      a annular rim base including:
         a cylindrical center section having opposed annular inner and outer edges;
         a cylindrical back section positioned on one side of said center section and having an annular inner edge, an annular outer edge and a radially outwardly facing circumferential surface for extending radially inside the bead of a tire when mounted on said wheel rim, said annular outer edge of said back section rigidly mounted to said annular inner edge of said center section;
      an annular inner side flange rigidly mounted to said inner edge of said back section and extending first radially from said inner edge of said back section and curving axially of said back section away from said center section and terminating in a laterally facing distal rim and forming an annular convex side seat for engaging the bead of a rubber tire, said inner side flange being thicker adjacent said back section than at said laterally facing distal rim and forming a rounded surface reinforcing rim free of sharp edges to avoid stress concentration in said reinforcing rim for strengthening said inner side flange;
      said rounded surface reinforcing rim located in axial alignment with said radially outwardly facing circumferential surface of said cylindrical back section; and
      a cylindrical gutter section positioned on the other side of said center section from said back section and having an annular inner edge rigidly mounted to said annular outer edge of said center section and defining an annular lock ring groove adjacent said annular outer edge for receiving therein a lock ring;

a second unitary piece comprising:
   a unitary bead seat and outer side flange including:
      a cylindrical bead seat of larger diameter than said gutter section telescopically movable onto said gutter section and including a radially outwardly facing circumferential surface for extending radially inside the bead of a tire when mounted on said wheel rim, and
      an annular outer side flange rigidly mounted to said bead seat and extending first radially from said bead seat and curving axially of said bead seat away from said center section and terminating in a bead seat rim facing laterally away from said center section and forming an annular convex side seat facing said center section for engaging the bead of a rubber tire, said outer side flange being thicker adjacent said bead seat than at said laterally facing bead seat rim and forming a rounded surface second reinforcing rim free of sharp edges to avoid stress concentration in said second reinforcing rim for strengthening said outer side flange, said rounded surface second reinforcing rim located in axial alignment with said radially outwardly facing circumferential surface of said bead seat, and said reinforcing rim of said outer side flange defining a sloped lock ring bearing surface;

a third piece comprising:
   a lock ring sized and shaped for fitting in said lock ring groove of said gutter section for engaging said sloped lock ring bearing surface of said reinforcing rim and locking said second piece on said first piece, said first and second unitary pieces having been forged.

2. The multiple piece wheel rim of claim 1, wherein said cylindrical back section is of larger diameter than said cylindrical gutter section, and the diameter of said cylindrical bead seat is substantially the same diameter as the diameter of said back section.

3. In a multiple piece wheel rim for large wheels of industrial vehicles for mounting rubber tires to a vehicle, including a cylindrical rim base about which beads of a tire are to be mounted, said cylindrical rim base having an inner annular edge and an outer annular edge, the improvement therein comprising
   a combined unitary bead seat and side flange mounted about the outer annular edge of said cylindrical rim base, including:
      a cylindrical bead seat having a radially outwardly facing circumferential surface for extending radially inside the bead of a tire when a tire is mounted on said wheel rim, said bead seat being of larger diameter than the diameter of said outer annular edge of said cylindrical rim base and telescopically mounted about and movable with respect to said cylindrical rim base;
      an annular outer side flange rigidly mounted to said bead seat, said outer side flange having a convex surface for facing the bead of a tire mounted on said bead seat and an opposed concave surface opposed said inner surface and facing away from said bead seat, said convex surface extending first radially from said cylindrical bead seat and curving axially of said bead seat away from said bead seat and terminating in an annular distal rim facing laterally away from said bead seat so that said convex surface forms an annular convex side seat for engaging and forming a bearing surface for a bead of a tire mounted on said bead seat;
      a rounded surface reinforcing rim free of sharp edges to avoid stress concentration in said reinforcing rim formed at the intersection of said annular side flange and said cylindrical bead seat, said reinforcing rim being of a greater breadth than either of said annular side flange or said bead seat;
      said rounded surface reinforcing rim located in axial alignment with said outwardly facing circumferential surface of said bead seat;
      an annular lock ring bearing surface formed on said reinforcing rim sloped at an acute angle from said cylindrical bead seat toward the concave surface of said annular side flange;
      said cylindrical bead seat defining an O-ring bearing surface for engaging an O-ring seal between said cylindrical bead seat and said cylindrical rim base; and
      said unitary bead seat, side flange and reinforcing rim characterized by having been forged.

4. The multiple piece wheel rim of claim 3, wherein said cylindrical rim base of said wheel rim includes an annular lock ring groove in registration with said lock ring bearing surface of said reinforcing rim, and a lock ring engaging said lock ring groove and said lock ring bearing surface and holding said unitary bead seat and said outer side flange together.

5. The multiple piece wheel rim of claim 4, wherein said cylindrical rim base defines an O-ring groove for retaining an O-ring seal in engagement with said O-ring bearing surface of said bead seat.

6. The multiple piece wheel rim of claim 4, wherein said rim base includes an annular inner side flange configured as a mirror image of said outer side flange.

* * * * *